United States Patent [19]

Ludwigs

[11] Patent Number: 4,600,176
[45] Date of Patent: Jul. 15, 1986

[54] APPARATUS FOR PRODUCING A CABLE CONDUIT SYSTEM SUITABLE FOR THE DRAWING-IN OF CABLES

[75] Inventor: Hermann Ludwigs, Eupen, Belgium

[73] Assignees: Kabel- und Gummiwerke, Aktiengesellschaft abgekürzt; "Kabelwerk Eupen", Manufactures de Cables Electrique et de Caoutchouc, Société Anonyme, en abrégé ; "Cablerie d'Eupen", Aktiengesellschaft, all of Eupen, Belgium

[21] Appl. No.: 705,434

[22] PCT Filed: Jun. 8, 1984

[86] PCT No.: PCT/BE84/00014
§ 371 Date: Jan. 23, 1985
§ 102(e) Date: Jan. 23, 1985

[87] PCT Pub. No.: WO84/04998
PCT Pub. Date: Dec. 20, 1984

[30] Foreign Application Priority Data

Jun. 10, 1983 [BE] Belgium .................................. 210979

[51] Int. Cl.⁴ .............................................. F21C 29/16
[52] U.S. Cl. .......................................... 254/134.3 FT
[58] Field of Search ............... 254/134.3 FT, 134.3 R, 254/134.3 PA, 394, 397, 404; 193/35 J, 35 R

[56] References Cited

U.S. PATENT DOCUMENTS

| 458,855 | 9/1891 | Meinzer ...................... 254/134.3 R |
| 1,514,612 | 11/1924 | Glasgow . |
| 2,286,781 | 6/1942 | Abramson et al. ........ 254/134.3 FT |
| 3,201,090 | 8/1965 | Jones ......................... 254/134.3 FT |
| 3,306,581 | 2/1967 | Miller ........................ 254/134.3 FT |
| 3,441,189 | 4/1969 | Erb et al. . |
| 3,770,233 | 11/1973 | McElroy . |
| 4,228,990 | 10/1980 | Horvath ................... 254/134.3 FT |

FOREIGN PATENT DOCUMENTS 269720  4/1927  United Kingdom .

Primary Examiner—Robert C. Watson

[57] ABSTRACT

Cable conduit system into which cables of great length, for example waveguide cables, can be drawn, characterized in that a device for the angular deflection of the path of the conduit or cable, in the form of a roller bend, is installed at points where the path of the conduit undergoes a critical change of direction or curvature, this roller bend being connected to the cable conduit in a completely sealed-off manner and support and guide rollers (22, 30) being arranged in various planes in the interior space (20) of this roller bend.

7 Claims, 4 Drawing Figures

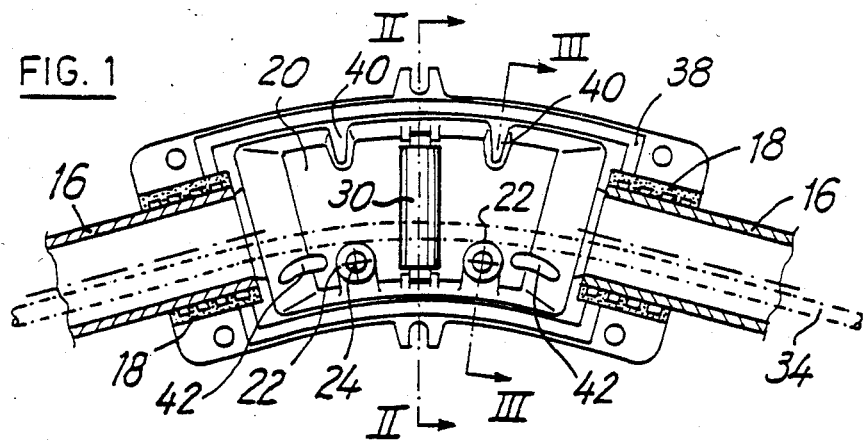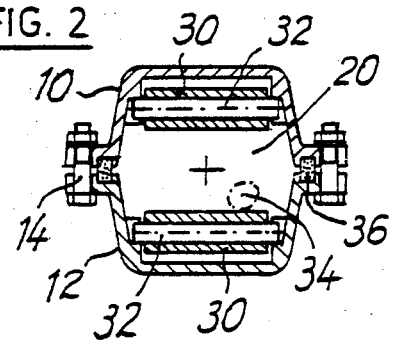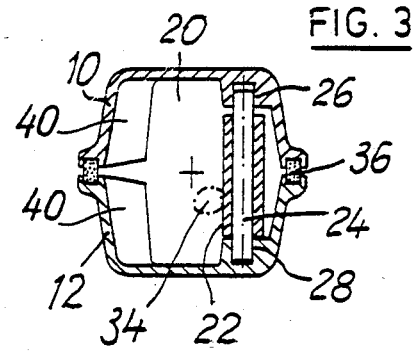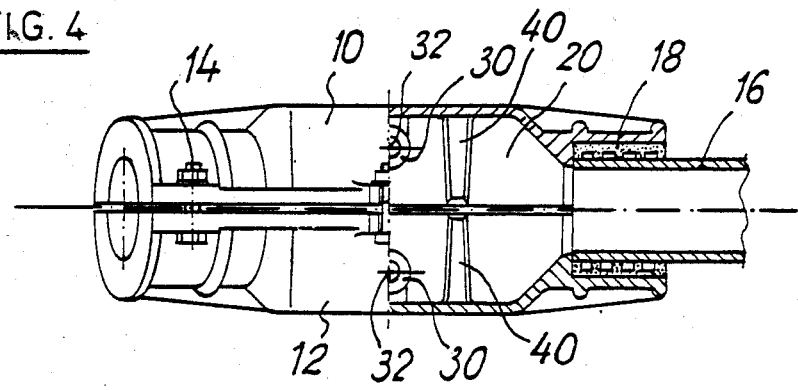

APPARATUS FOR PRODUCING A CABLE CONDUIT SYSTEM SUITABLE FOR THE DRAWING-IN OF CABLES

The subject of the present invention is the production of a cable conduit system for the laying of cables, generally buried cables, of great factory length, for example waveguide cables.

As is known, the connecting of two factory lengths possessing waveguides involves a considerable outlay in terms of technology and expenditure. For this reason, efforts are made to keep these connection or splicing points to a minimum by manufacturing long lengths of cable, which can amount to 1,000 m or more.

The problem underlying the invention described here consists, then, in drawing such long lengths of cable into a cable conduit system in one pull, and doing so irrespective of the topographical conditions of the terrain in which the cable conduit system is laid and without making use of specialised or heavy equipment.

Experience now shows that coating the drawing element and the interior surface of the conduit with a lubricant is not sufficient to overcome the frictional forces arising, in accordance with the law $e\mu\alpha$, in the bends in the conduit, which are sometimes three-dimensional.

The conventional technique for laying cables in trenches makes use of cable-laying rollers to reduce these frictional resistances, particularly where the path of the cable undergoes a change of direction of a curvature.

The object of the present invention is to apply this technique to the special case of drawing cables into the cable conduit described, with the aim of providing a self-contained, complete and leak-tight pipeline system.

In accordance with this object, the invention relates to a method whose distinctive feature consists in the fact that the devices according to the invention are installed at points where the run of the cable conduit undergoes critical changes of direction or curvatures. These devices, which are leak-tight themselves, are also connected to the cable conduit in a manner which is tight against dust, water and moisture. Support rollers and guide rollers are arranged in various planes within the interior space of these devices.

The effect achieved by the invention is that a cable conduit manufactured in great lengths (for example 1,000 m), which is delivered ready-to-use to the construction site and is laid, there, can immediately be used for the drawing-in of cables. This conduit contains the drawing element necessary for drawing in the cable, and is treated in a manner such that the slip resistance of the conduit is low and the conduit and drawing elements are protected against corrosion.

One of the possible, non-limited types of embodiment consists, for example, of a high-density polyethylene pipe with galvanised steel wire laid therein and, if appropriate, containing lubricant which simultaneously imparts to the galvanised steel wire additional protection against corrosion.

Clearly, the invention relates to these devices, which are referred to as roller bends in the text which follows. These roller bends represent a completely novel commercial article.

For the sake of clarity, an exemplary embodiment is described in the text which follows, with reference to the attached figures:

FIG. 1: view of an open roller bend;
FIG. 2: view according to the section II—II in FIG. 1;
FIG. 3: view according to the section III—III in FIG. 1;
FIG. 4: side view of a partly open roller bend.

The axial sections of the cable conduits are designated (16) in the figures.

According to the invention, one or more such roller bends, according to the example in the drawing, are installed in the cable conduit at points of critical changes of direction or curvatures. The roller bend consists of two-half-shells (10) and (12), as a result of which it is not necessary to cut the drawing elememt located in the cable conduit when installing the roller bend. The two half-shells are held together by screws (14). The entrance to and the exit from the roller bend are so designed as to be able to accept the ends (16) of the conduit which has been cut at the critical point, and form a leak-tight seal with these by means of the gaskets (18).

Guide rollers and support rollers (22) are arranged on spindles (24) within the interior space (20) of the roller bend. The spindles (24) are mounted in the recesses (26) and (28) which are present in the corresponding half-shells (10) and (12). The rollers (22) are in each case located on the inside of the roller bend.

Advantageously, a roller (30) running on a spindle (32) is attached within each half-shell and is aligned perpendicularly to the spindles (24) of the rollers (22).

In this manner effective guidance and easy sliding of the cable (34) are achieved when the latter is drawn in through the roller bend according to the invention.

During the drawing-in of the cable, the cable (34) will thus unroll on the rollers (22) and be additionally guided by the rollers (30), depending on the bend in each case.

The gasket (36) lying in the grooves (38) of each half-shell ensures the sealing-off of the interior space (20) of the roller bend.

If appropriate, projections (40) and fixed centering elements (42) may also be provided in the interior space (20) to provide improved and error-free guiding of the cable to be drawn through the roller bend.

The construction material of the roller bend may be metallic. More advantageously, it is made from corrosion-free, synthetic material.

The degree of deflection of the roller bend can be designed for any change of direction by the cable conduit.

The device described in the preceding text and the corresponding method are capable of further development and are to be regarded only as a non-limiting example.

I claim:

1. An elbow for use in cable conduit systems to facilitate the pulling of cable through such conduits at a point where the conduit materially changes direction comprising,
   a hollow curved body;
   means for hermetically sealing said body at each end thereof to a cable conduit; and
   first roller means disposed completely within said hollow body in a first plane and second roller means spaced from said first roller means and disposed completely within said body in a second plane for guiding a cable therethrough.

2. An elbow according to claim 1, wherein said hollow curved body is formed by two shell-like members hermetically sealed together, whereby the elbow may be inserted in a cable conduit without cutting the cable or the means for drawing the cable through the conduit.

3. An elbow according to claim 2, wherein said first and second roller means are supported by corresponding recesses within each of said shell-like members.

4. An elbow according to claim 1, wherein said first and second roller means are disposed in planes perpendicular to one another.

5. An elbow according to claim 2, wherein said shell-like members are arcuately joined along the line of curvature of said hollow body.

6. An elbow according to claim 1, wherein said first roller means comprises a pair of opposed rollers each disposed near an inner face of said hollow body and in line with the radius of curvature thereof, and said second roller means comprises a roller disposed on each side of said first roller means near an inner curved face of said hollow body and perpendicular to said radius.

7. An elbow according to claim 6, wherein said rollers are cylindrical.

* * * * *